Oct. 6, 1964 T. E. ANDREWS 3,152,243
COOKING APPLIANCE OR TOASTER
Filed Feb. 25, 1963 2 Sheets-Sheet 1

Inventor:
Theodore E. Andrews,
by Lawrence R. Kempton
His Attorney

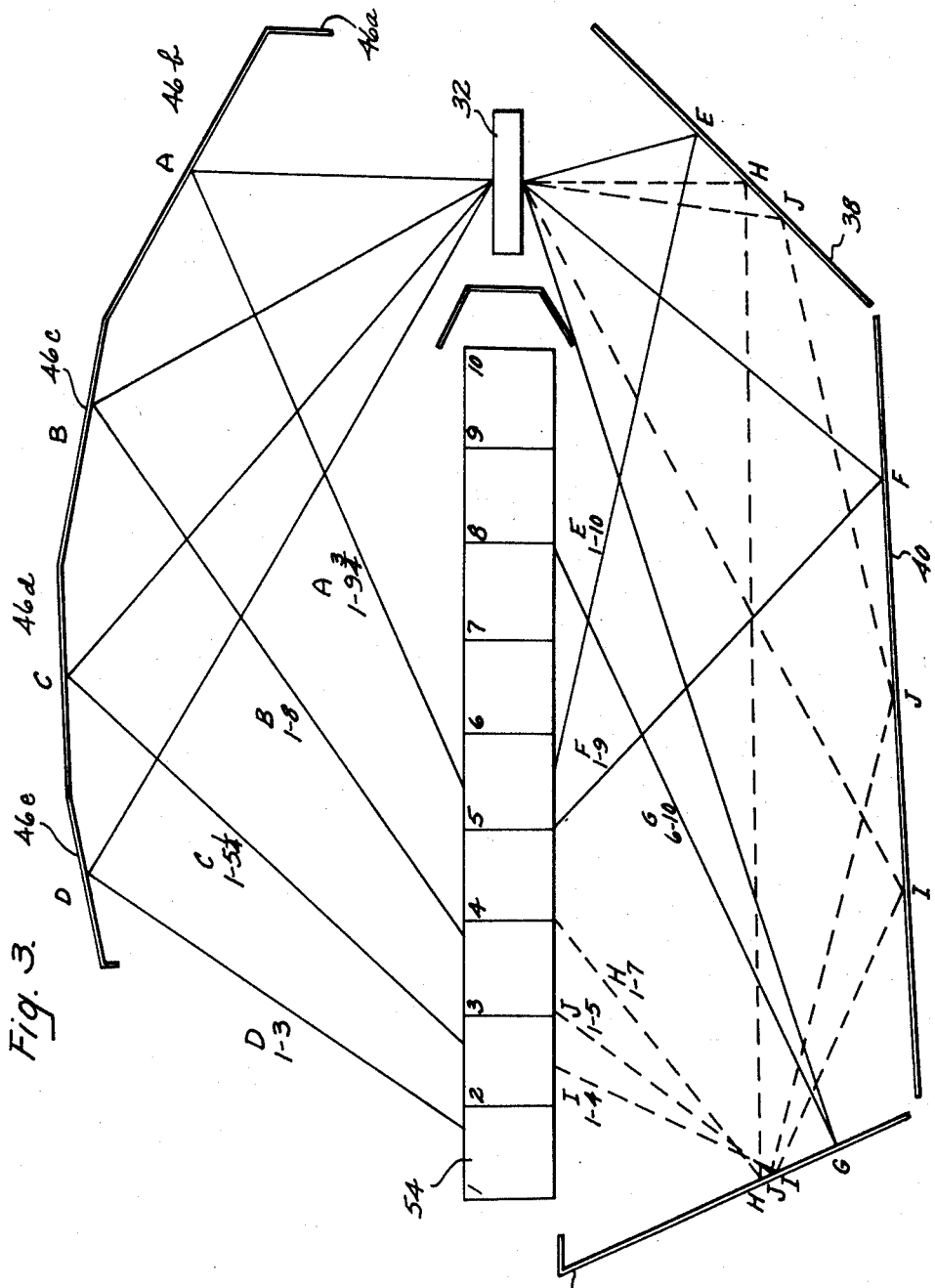

United States Patent Office 3,152,243
Patented Oct. 6, 1964

3,152,243
COOKING APPLIANCE OR TOASTER
Theodore E. Andrews, Orefield, Pa., assignor to General Electric Company, a corporation of New York
Filed Feb. 25, 1963, Ser. No. 260,444
15 Claims. (Cl. 219—405)

This invention relates to an electric cooking appliance or toaster of the type having a horizontally disposed toasting rack area for receiving bread, open-faced sandwiches, or similar food.

Desirable features in a toaster are that it be versatile, convenient and inexpensive to manufacture. To be versatile, the toaster should be able to rapidly heat or toast open-faced sandwiches, English muffins and similar food as well as conventional slices of bread. To be convenient, the toaster should have simple controls and ready access to the toasting chamber for insertion and removal of food. Manufacturing costs may be kept to a minimum by having low cost components and by minimizing the number of components needed.

The well-known type of toaster having a vertically disposed toasting chamber does an excellent job of toasting bread but has the disadvantage of not being able to handle foods which cannot be vertically positioned on an edge surface. Also, such toaster requires a bread moving mechanism which adds to its cost. Those toasters which do have a horizontally disposed toasting chamber typically also include a vertical type chamber or else can only toast one surface of the food at a time or require heating elements above and below the horizontal food supporting surface to toast bread in one operation. Further, those toasters having the horizontal chamber usually need some sort of food moving mechanism for convenient insertion and removal of the food.

From the foregoing discussion it can be appreciated that a need exists for a versatile toasting appliance which has a single toasting chamber and which is convenient to operate and inexpensive to manufacture; accordingly, it is a primary object of this invention to provide such an appliance.

It is another object of this invention to provide a cooking appliance or toaster having a horizontally disposed toasting chamber and a unique heat reflection system to toast bread or similar food on both sides at the same time.

It is a further object of this invention to provide an improved low cost toaster having an easily accessible horizontally disposed toasting chamber not requiring a food moving mechanism and having a minimum number of parts which are easily manufactured.

Yet another object of the invention is to provide an improved toaster having an open front and a partially open top which permits food to be easily inserted and removed by hand without touching the toaster and also permits the user to watch the food while it is being toasted.

Briefly stated, the invention relates to a toaster or similar cooking appliance having a horizontally disposed food supporting rack with an elongated heater positioned at the rear of the rack. A shield positioned between the heater and the rack prevents radiant heat from emanating directly onto the rack area. Heat reflecting surfaces are so shaped and positioned beneath the heater and the rack area that radiant heat from the heater is reflected at essentially uniform intensity in an upwardly direction over the rack area. Heat reflecting surfaces positioned in the upper portion of the toaster extend over only a portion of the rack area to reflect radiant heat from the heater at essentially uniform intensity downwardly over the rack area. Such an arrangement provides ready access to the rack area and requires no complicated food moving mechanism.

Further features, objects and attendant advantages will become apparent with reference to the following description and drawings in which:

FIG. 3 is a schematic view of the reflection system of the toaster.

Figure 1:
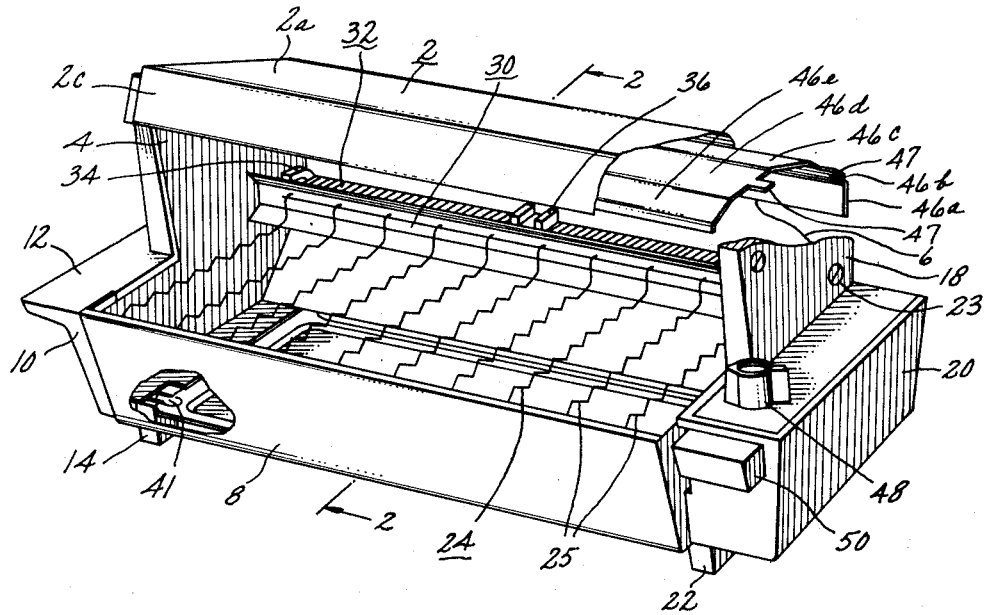
FIG. 1 is a perspective partially cut-away view of the new and improved toaster of the invention.
Figure 2:
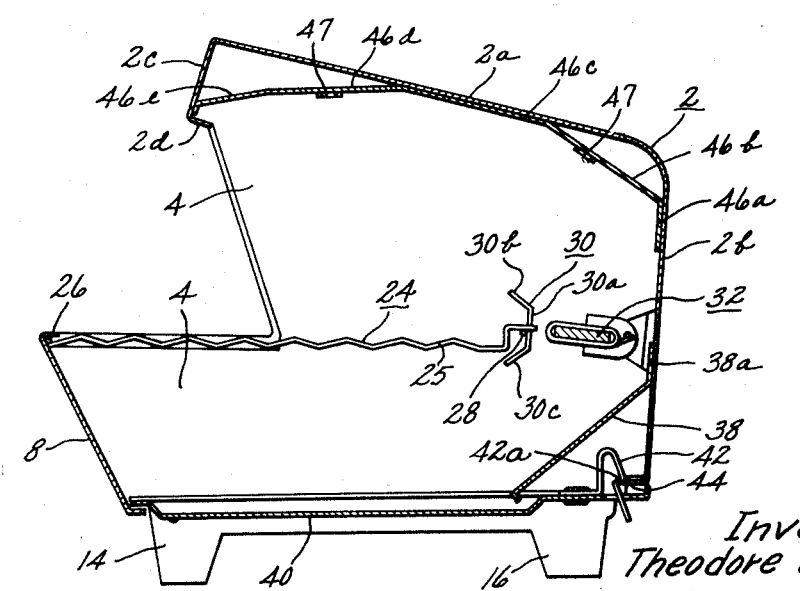
FIG. 2 is a cross-sectional view of the toaster of the invention taken along the lines 2—2 of FIG. 1.

The openness and simplicity of construction of the unique toaster of the invention may be partially appreciated from a brief perusal of FIGS. 1 and 2. It may be seen that the toaster includes an outer shell member 2 which forms a top wall 2a covering only a portion of the toaster, and forming a rear wall 2b extending to the lower rear edge of the toaster. A front portion of the top wall 2a is bent to form a downwardly extending wall 2c. The outer shell member 2 fits over and is hooked to the top front edge of a left-hand sheet metal end plate 4 and a similar right-hand end plate 6.

It may be seen that the side plates 4 and 6 have front edges which extend upwardly at an angle with respect to the vertical and which support a mating front wall 8 in any suitable fashion. The left-hand plate 4 is secured to an end support member 10 having a shape similar to the end plate 4 and including an outwardly extending flange 12 and downwardly extending legs 14 and 16. The support member 10 is preferably made of plastic or similar electrical and heat insulating material. Plastic of course is easily molded so that the support member may be formed as an integral piece. The right-hand plate 6 is secured to an upper support member 18 and a lower member 20 which serves as a support and a housing for the toaster controls which will be hereinafter described. The housing 20 is provided with legs similar to legs 14 and 16, one of which is shown at 22 in FIG. 1. The flange 12 and housing 20 make convenient handles for lifting or moving the toaster, even while hot. The end plates may be secured to the plastic support members by any suitable fastening devices such as screws 23, shown installed in support member 18.

The remaining external element of the toaster is a bottom wall 40 extending from the lower edge of rear wall 2b forwardly to the lower edge of front wall 8. Bottom wall 40 extends beneath the rack 24 in roughly parallel relation to the rack to serve as a crumb tray for crumbs and other material. To permit periodic removal of the accumulated material, the tray should be removably secured to the surrounding structure, in some convenient manner. For example, the leading edge of the tray may be provided with integrally formed hinge pins on each end, one of which is shown at 41 in FIG. 1. The hinge pins are adapted to be received in mating holes in plates 4 and 6 and aligned recesses or sockets in the plastic support members 10 and 20 so that the tray may be swung downwardly about the axis formed by the pins.

The rear edge of the crumb tray 40, as seen from FIG. 2, is provided with a flat spring doubled on itself to form an irregularly shaped resilient clip 42 having one end riveted to the crumb tray and the other end extending through the opening in the tray to provide a manually movable latch accessible from the bottom rear portion of the toaster. The clip 42 is provided with a shoulder 42a which cooperates with a forwardly extending flange 44 on the rear wall 2b. When the clip is positioned as shown in FIG. 2, shoulder 42a abuts flange 44 to hold the tray in its closed position. By manually moving the accessible end of the clip 42 forwardly against the resiliency of the clip, the tray may be easily swung downwardly.

Turning now to the internal components of the toaster, the principal elements are a food or toast supporting rack 24, a heater 32, a guard or shield 30 extending between the rack and the heater, and upper and lower heat reflection systems. The rack 24 is formed from a plurality of spaced wires 25 extending from front to rear in parallel relation to each other and the side plates 4 and 6. The wires 25 are attached to a front support wire 26 and a rear support 28, with the wire 26 being secured to the front wall 8 and the rear ends of wires 24 extending through apertures formed in shield 30. As may be seen from FIGS. 1 and 2, each of the wires 25 is formed with a plurality of bumps or sinuations in the vertical plane so that the entire upper surfaces of the wires do not contact the bread or other food supported thereon, thus minimizing the possibility of burning or marking the food. As can be seen from the drawings, the rack extends in a substantially horizontal position and in roughly parallel relation to the crumb tray 40.

Naturally, the rack 24 may be sized as desired, but a convenient area is one large enough to handle two standard sized bread slices when placed side by side with their bottom surfaces in contact with the rear vertically extending portions of the rack wires 25. To facilitate the inspection and the removal and insertion of food, the rack 24 is adequately spaced from the lower edge of the top forward wall 2c and its rearwardly extending flange 2d. For example, in a production model of the toaster, this dimension is approximately 2¼ to 2½ inches, or roughly twice the size shown in the drawings.

In accordance with the invention, heat is provided by the single stick type heater 32 having a ceramic core extending between the two end plates 4 and 6 with a resistance wire wound thereon. The heater core is mounted on suitable ceramic supports on each end, one of which is shown at 34 secured to the end plate 4, and an additional center support 36 is shown riveted to the shield 30. It should be noted that the heater 32 is positioned in approximately the plane which would be occupied by a slice of bread when placed on the rack 24. The cross-sectional shape of the heater ceramic core has been carefully selected to obtain the necessary heat output, strength and rigidity, and the proper relation between shield 30 and the food to be placed on the rack.

In accordance with the invention, the bread or food to be placed on the rack 24 is to be toasted entirely by reflected radiant heat energy. Thus it is desirable to utilize a heater which will provide maximum heater surface image on the reflective surfaces while having a minimum of heater surface which will not be reflected onto the reflective surfaces, thereby minimizing ambient temperatures. Therefore, the front and rear surfaces presented by the heater 30 should be as thin in the vertical direction as possible. On the other hand, the length of the heater, being slightly greater than the width of two standard slices of bread, requires that the ceramic core be of sufficient thickness to give the needed rigidity to withstand the shocks and abuse to which the appliance may normally be expected to be subjected. These various factors dictate that a relatively flat, somewhat rectangular heater cross-section is most desirable with the flat or longer dimension of the core being substantially parallel to the rack.

The shield 30 is an elongated member having a vertically disposed central section 30a and upper and lower forwardly extending flanges 30b and 30c. The ends of the shield are secured to the end plates 4 and 6, respectively, in any suitable manner such as mating tabs and slots. With a heater as described above, the shield central section 30a need only be approximately the height equal to the thickness of a standard slice of bread to prevent radiant energy from emanating directly from the heater onto a slice of bread placed on the rack 24. With the addition of the forwardly extending flange 30b and 30c radiant heat energy is also prevented from escaping directly from the heater through the front opening of the toaster defined by the lower front portion of the shell 2 and the top edge of front wall 8.

To reflect heat onto the bread rack area from above and from below simultaneously, the toaster has been uniquely provided with a series of reflecting surfaces. The lower reflective system includes the inner planar surface of element 38, the inner surface of crumb tray or bottom wall 40 and the inner surface of front wall 8. Element 38 extends forwardly beneath heater 32 at an obtuse angle from the rear wall 2b toward the crumb tray 40. Element 38 may be supported by end plates 4 and 6 by any suitable means such as mating slots and tabs. Incidentally, an upper vertically extending portion 38a of element 38 engages the rear wall 26 and serves to assist in supporting the outer shell 2 by suitably connecting the engaging surfaces. Front wall 8 extends forwardly and upwardly from crumb tray 40 forming an obtuse angle with the crumb tray and being in roughly perpendicular relation to element 38.

The prime objective of the lower reflector system is, of course, to obtain an even toasting pattern in an efficient manner on the bottom surface of the toast. As a corollary to this objective, it is necessary to minimize the contribution of energy reflected off the crumb tray 40 to the toasting pattern to thus minimize the drop in toasting efficiency and distortion of the pattern when the crumb tray becomes covered with crumbs, butter stains, burned-on cheese, etc. To accomplish these objectives, the materials and areas of the reflective surfaces and the angular relationships between the reflective surfaces, the heater and the rack area have been carefully selected. Surface 38 provides the major portion of the reflected energy because of several factors. It is close to heater 30, and the angular position of surface 38 to the plane of the bread is such that the reflected image of the heater 30 contributes to substantially the entire bottom portion of the bread. Naturally a greater contribution of energy is received on the rear portion since the rays are shortest in this area. Further, surface 38 is made of bright aluminum which has an extremely high reflectivity factor for reflecting infrared energy.

The inner surface of crumb tray 40 is made of a material having a lower reflectivity factor such as aluminized steel which has a factor of about .53, relative to bright aluminum, or only a little over half as effective as bright aluminum for reflecting infrared energy. Thus, the intensity of energy from the crumb tray is relatively low so that the toasting pattern and efficiency of the toaster is little affected by even a considerable accumulation of crumbs or other material on the surface. In this connection, it should be noted that the forward edge of surface 38 is positioned sufficiently to the rear of the rack area such that an accumulation of crumbs on the crumb tray does not interfere with the reflection of energy surface 38 directly onto the rack area.

The inner surface of front wall 8 is designed to fill in the toasting pattern in the front portion of the lower bread surface. With the other surfaces 38 and 40, it has been found that a finish of chrome plated steel is preferable for the inner surface of wall 8. It has a reflectivity factor of approximately .70, relative to bright aluminum, which is greater than that of the crumb tray surface but less than that of the bright aluminum utilized for element 38.

The energy contributions made by the three reflective surfaces in the lower heat reflecting system may be more clearly understood with reference to the schematic diagram of FIG. 3. In the diagram, lines have been drawn from the midpoint of the lower surface of the heater 30 to the various reflective surfaces. It should be understood that the lines represent the entire band of radiant energy emanating from the heater toward a particular surface area even though the line is shown drawn from the midpoint of the heater. Also, the lines have been shown as striking the reflective surface at approximately the midpoint of the band of energy which is eventually reflected onto the lower surface of the rack area. A standard slice of bread 54 is schematically shown in the position it would occupy when supported by the rack 24. The edge surface of the bread has been broken into equal sections to more easily visualize the area covered by the band of reflected energy received from a particular reflective surface.

As shown, the solid line E emanating from heater 30 strikes reflective surface 38 and is reflected to a point midway between the lower edges of the bread 54. As indicated by the numbers 1–10, the line E represents a band of energy which covers substantially the entire lower surface of the bread. It is this reflective heat source which provides the majority of energy to the lower surface of the bread. Of lesser significance is the reflected energy band indicated by the line F which strikes the crumb tray 40 and is reflected upwardly striking the lower surface of the bread 54 between the lines 1 and 9. Solid line G represents the energy directly received from the heater by front wall 8 to fill in the toasting pattern between the lines 6–10 on the rear portion of the bread 54. The remaining dotted lines H, I and J represent multiple reflections which are utilized to primarily fill in the toasting pattern at the front portion of the lower bread surface. Naturally, due to the length of the reflective paths represented by these dotted lines and the compounded reflectivity factors involved, the energy contribution of these multiple reflections is relatively low. Nevertheless, they are an important factor in obtaining a uniform toasting pattern.

The lower reflection system described above is broadly claimed in this document and specifically claimed in a co-pending application by Alfred E. De Mott, also assigned to the General Electric Company.

The upper heat reflecting system includes a unique reflecting member 46 having a plurality of obtuse angular bends forming a plurality of planar surfaces. The reflecting member 46 extends between and is supported by tabs 47 cooperating with slots in the end plates 4 and 6. As can be seen from FIG. 2, the reflector 46 roughly conforms to the upper cross-sectional shape of the outer shell 2.

The additional reflecting surfaces extending from surface 46a forwardly are 46b, 46c, 46d and 46e. As with the reflective surfaces of the lower system, surfaces 46b through 46e have been sized and angularly arranged with respect to each other, the heater, and the rack 24 so that radiant heat from the heater 32 striking the reflective surfaces is reflected downwardly towards the rack area at substantially uniform intensity. Member 46 may be given the reflective surface material needed, and in the present instance bright aluminum has been chosen.

In accordance with the invention, the reflector 46 and outer shell 2 extend over less than approximately seventy-five percent of the rack area, but yet the reflecting surfaces are uniquely arranged so that an even toasting pattern is obtained and the amount of radiant heat lost through the front opening defined by outer shell 2 and front wall 8 is kept to a minimum. With such an arrangement, the toaster and surrounding area are kept sufficiently cool so that the user can comfortably place food onto the rack area by hand and remove it from the rack area by hand after the toasting operation. Since the outer shell 2 and reflector 46 do not extend over the entire rack area, hand access to the rack is very simple and convenient. Such a construction eliminates the need for expensive food moving mechanisms utilized in most toasters.

Another advantage of the toaster of the invention is that the user can observe the food as it is being toasted. This not only permits the user to interrupt the toasting cycle at the exact desired degree of brownness, but additionally has further appeal in that it permits the user to watch the interesting phenomena of a toasting operation.

To more clearly understand the operation of the upper reflection system, reference may be made again to the schematic diagram of FIG. 3. As similarly explained in connection with the lower reflection system, the lines shown emanating from the midpoint of the upper surface of heater 32 onto the various reflective surfaces represent the midpoint of the bands of energy emanating from the entire upper heater surface toward the particular reflecting surface, and the point at which the line strikes the reflecting surface represents the midpoint of the band of energy which is ultimately reflected onto the bread 54. As can be seen, line A strikes reflective surface 46b and is reflected onto substantially the midpoint of the upper surface of the slice of bread 54. This location on the bread coupled with the numbers 1–9¾ shown adjacent the letter A indicates that the band of energy received from reflective surface 46b covers substantially the entire upper surface of the bread. Since reflective surface 46b is situated to provide the shortest reflection path from the heater 32 and due to the reflection angles involved, the heat contribution of surface 46b is greater than that of the other surfaces 46c–46e.

Naturally, since the portion of the energy band represented by line A striking the rear portion of the slice of bread 54 has a shorter reflection path than the energy striking the front portion of the bread, the heat concentration from the band represented by line A is greater at the rear of the bread slice. Accordingly, reflective surfaces 46c, 46d and 46e are positioned and adapted to fill in the toasting pattern and are primarily directed to the front portion of the bread. Reflective surface 46c extends from a point substantially vertically above the rear of the rack area and extends forwardly over the rear portion of the rack area. The band of energy represented by line B is reflected onto the bread sections indicated by lines 1–8. Reflective surface 46d extends over the mid-portion of the rack area; and its band of radiant heat energy as represented by line C is directed onto the front half of the slice of bread. Reflective surface 46e forms an obtuse angle with surface 46d and extends forwardly to the front edge 2c of outer shell 2. Surface 46e receives a band of energy from heater 32 as represented by the line D which is directed downwardly over the portion of the rack area or upper bread surface represented by the lines 1–3. From the foregoing, it can be seen that the cumulative effect of the upper reflection system is that radiant heat energy from the heater 32 is reflected downwardly toward the rack area at substantially uniform intensity to provide a uniform toasting pattern on the upper surface of the bread.

Within the housing 20, there is provided a suitable timer of the heat-up, cool-down type for controlling the duration of the toasting cycle and a switching mechanism for initiating the beginning of the toasting cycle and automatically terminating the cycle. The knob 48 provides a rotatable manual control for varying the degree of brownness to which the food is to be subjected. Button 50 can be moved manually downwardly to initiate the toasting cycle and it is automatically moved upwardly at completion of the toasting cycle. Additionally the button 50 may be manually moved upwardly at any time to interrupt the toasting cycle. Since the operation of the timer is not essential to an understanding of the present invention, and further forms the basis for a separate application, Serial No. 268,894, filed March 29, 1963, by Theodore E. Andrews and assigned to the same assignee as the present invention, the timer will not be disclosed or described in this application. It will be appreciated, however, that various suitable timing arrangements can be employed with the toaster heretofore described.

In view of the foregoing description, the operation of the toaster is no doubt readily apparent. The user need merely rotate the knob 48 to the desired setting, place the food onto the rack 24, with an edge surface preferably abutting the vertical portions of the wires 25 adjacent to the shield 30; and start the toasting cycle by depressing button 50. After a predetermined interval the cycle will end and button 50 will return to its inoperative position.

It will be understood from the foregoing that certain aspects of the invention are not limited to the particular details of construction illustrated, and it is contemplated that other modifications and variations will occur to those skilled in the art. Accordingly, it is intended that the appended claims shall cover such modifications and variations that do not depart from the true spirit and scope of the invention.

What I claim is:

1. A toaster comprising a food supporting rack supported in a substantially horizontal position, an elongated heater extending along and adjacent substantially the entire rear edge of said rack, a shield positioned between said heater and said rack to prevent radiant heat from said heater from emanating directly onto the rack area, lower heat reflection means extending beneath the heater and substantially the entire rack area to reflect radiant heat from said heater at essentially uniform intensity in an upward direction onto the rack area, and upper heat reflection means extending over said heater and not more than seventy-five percent of the rack area to reflect radiant heat from said heater at essentially uniform intensity downwardly over the rack area.

2. In a toaster, a horizontally disposed food support, an elongated heater extending along and adjacent the rear edge of said support, a shield positioned between the heater and the support, lower heat reflection means for reflecting radiant heat from said heater at essentially uniform intensity in an upward direction onto the food support area, and upper heat reflection means extending over no more than 75% of the support area to reflect radiant heat from said heater at essentially uniform intensity downwardly over the support area, said lower heat reflection means including a plurality of angularly adjoined planar reflection surfaces extending beneath said heater and substantially the entire area of said food support.

3. In a toaster, a horizontally disposed food support, an elongated heater extending along and adjacent the rear edge of said support, a shield positioned between the heater and the support, lower heat reflection means extending beneath the heater and substantially the entire rack area for reflecting radiant heat from said heater at essentially uniform intensity in an upward direction over the support area, and upper heat reflection means extending over no more than 75% of the support area to reflect radiant heat from said heater at essentially uniform intensity downwardly over the support area, said upper heat reflection means comprising a plurality of planar surfaces connected to form a plurality of obtuse angles as the surfaces extend from the rear of the toaster partially over the support area.

4. In a toaster, a horizontal food supporting rack, an elongated heater extending along and adjacent substantially the entire rear edge of said rack, a shield positioned between the heater and said rack, lower heat reflection means for reflecting radiant heat from said heater at essentially uniform intensity in an upward direction onto the rack area, and upper heat reflection means extending over less than seventy-five percent of the rack area to reflect radiant heat from said heater at essentially uniform intensity downwardly over the rack area and to restrict outward radiation beyond the rack area, said upper heat reflection means including a first surface extending the length of said heater and from the rear of said toaster over said heater, and a plurality of planar reflective surfaces extending forwardly from said first surface with each surface angularly adjoining the front edge of the preceding surface.

5. A toaster comprising a food supporting rack supported in a substantially horizontal position, an elongated heater extending along and adjacent substantially the entire rear edge of said rack, a shield positioned between said heater and said rack to prevent heat from said heater from emanating directly onto the rack area, lower heat reflection means to reflect radiant heat from said heater in an upward direction onto the rack area, and upper heat reflection means extending over not more than seventy-five percent of the rack area to reflect radiant heat from said heater downwardly over the rack area, said upper and lower heat reflection means including a plurality of surfaces each adapted to reflect heat onto the rack area with non-uniform intensity but said surfaces being so shaped and arranged that the cumulative effect is that heat is directed with substantially uniform intensity onto the rack area.

6. In a toaster, a food supporting rack, means for supporting said rack in a substantially horizontal position, an elongated heater extending along and adjacent substantially the entire rear edge of said rack, said heater including a resistance heating element wound on a ceramic core having a relatively flat cross-section positioned parallel to the rack, a shield extending the length of said heater between the heater and the rack to prevent direct radiation onto the rack area, lower heat reflection means extending beneath substantially the entire rack area for reflecting radiant heat from said heater at essentially uniform intensity in an upward direction onto the rack area, and upper heat reflection means for reflecting radiant heat from said heater at essentially uniform intensity downwardly over the entire rack area, said upper heat reflection means extending over no more than 75% of said rack area to permit food to be easily placed onto and removed from the rack by hand without contacting the surrounding toaster structure.

7. A toaster comprising a rack sufficiently large to support two standard size slices of bread placed side by side on one of their large surfaces, means for supporting the rack in substantially horizontal position, an elongated heater extending along and adjacent substantially the entire rear edge of said rack, an elongated shield extending between the heater and said rack, said shield having a vertical dimension at least as great as the thickness of a standard slice of bread, lower heat reflection means extending beneath said heater and substantially the entire rack area to reflect radiant heat from said heater at substantially uniform intensity in an upward direction over the rack area, and an upper heat reflection means extending over no more than 75% of the rack area to reflect radiant heat from said heater at essentially uniform intensity downwardly over the rack area.

8. In a cooking appliance, a horizontal food supporting rack, an elongated heater extending along and adjacent substantially the entire rear edge of said rack, a shield positioned between the heater and said rack, and a heat reflection system including upper heat reflection means extending over less than seventy-five percent of the rack area to reflect radiant heat from said heater at essentially uniform intensity downwardly over the rack area and to restrict outward radiation beyond the rack area, said upper heat reflection means including a first surface extending the length of said heater and from the rear of said toaster over said heater, and a plurality of planar reflective surfaces extending forwardly from said first surface with each surface angularly adjoining the front edge of the preceding surface.

9. In a toaster, a horizontally disposed food supporting rack, an elongated heater extending along and adjacent the rear edge of said rack, a shield extending between said heater and said rack, and a heat reflection system including an upper heat reflection means extending over no more than 75% of the rack area to reflect radiant heat from said heater at essentially uniform intensity downwardly over the rack area, an outer shell including a rear wall and an upper wall enclosing said upper heat reflection means, said outer shell having its forwardmost edge being substantially to the rear of and above the forward edge of said rack to provide an access opening for permitting food to be easily placed on and removed from the rack by hand without contacting the surrounding toaster structure, said upper heat reflection means comprising a first surface extending above said heater from said rear wall angularly towards said upper wall, a second surface angularly adjoining the front edge of said first surface and extending over the rear portion of said rack, a third surface angularly adjoining the front edge of said second surface and extending over a central portion of said rack, and a fourth surface angularly adjoining the front edge of said third surface and extending toward a front portion of said upper wall.

10. A toaster comprising a pair of spaced sheet metal support plates, an elongated heater extending horizontally between said support plates with each end of said heater being supported by a respective one of said plates, a grill-like food supporting rack supported in a substantially horizontal position in front of said heater, a shield extending the length of said heater between the heater and the rack to prevent direct radiation onto said rack area, said shield having its ends connected to said support plates, lower heat reflection means extending beneath the heater and substantially the entire rack area for reflecting radiant heat from said heater at essentially uniform intensity in an upward direction onto the rack area, upper heat reflection means for reflecting radiant heat from said heater at essentially uniform intensity downwardly over the entire rack area, said upper heat reflection means extending over said heater and only a portion of said rack area so that there is nothing above the front approximately one-quarter portion of the rack thus permitting food to be easily placed on and removed from the rack by hand without contacting the surrounding toaster structure, said upper and lower heat reflection means being supported by said support plates, and heat insulating means attached to said support plates including leg means for contacting a supporting surface and handle means by which the toaster may be held.

11. A toaster including a food supporting rack mounted in a substantially horizontal position, an elongated heater extending along and adjacent substantially the entire rear edge of said rack, a shield positioned between said heater and said rack to prevent radiant heat from said heater from emanating directly onto the rack area, lower heat reflection means extending beneath the heater and substantially the entire rack area to reflect radiant heat from said heater at essentially uniform intensity in an upward direction onto the rack area, upper heat reflection means extending over said heater and over only approximately the rear three-fourths of said rack to reflect radiant heat from the heater at essentially uniform intensity downwardly over the rack area, a toaster control housing positioned adjacent one end of said rack and heater extending from the level of the rack downwardly to the bottom of the toaster and from the front to the rear of the toaster and control levers for operating said toaster extending through the front and top walls of said control housing.

12. A toaster comprising a food supporting rack mounted in a substantially horizontal position and having a front to rear dimension slightly greater than the height of an average slice of bread, an elongated heater extending along and adjacent substantially the entire rear edge of said rack, a shield positioned between said heater and said rack to prevent radiant heat from said heater from emanating directly onto the rack area, lower heat reflection means extending beneath the heater and substantially the entire rack area to reflect radiant heat from said heater at essentially uniform intensity in an upward direction onto the rack area, and upper heat reflection means extending over said heater and a portion of said rack area to reflect radiant heat from said heater at essentially uniform intensity downwardly over the rack area, the forward portion of said upper heat reflection means being positioned at least one inch to the rear of the forward portion of said rack and being spaced at least two inches above said rack whereby food may be easily placed on and removed from the rack by hand without contacting the surrounding toaster structure.

13. A toaster comprising a food supporting rack supported in a substantially horizontal position, heating means extending along and adjacent substantially the entire rear edge of said rack, shield means extending the length of said heating means between the heater and the rack to prevent direct radiation from the heater from impinging onto the rack area, lower heat reflection means extending beneath the heater and substantially the entire rack area for reflecting radiant heat from said heater at essentially uniform intensity in an upward direction onto the rack area, and upper heat reflection means for reflecting radiant heat from said heater at essentially uniform intensity downwardly over the rack area, said upper heat reflection means extending over said heater and over the rear and central portions of said rack area but being positioned substantially to the rear of the forward portion of said rack by approximately one-fourth of the fore-aft dimension thereof to permit food to be easily placed on and removed from the rack by hand without contacting the surrounding toaster structure.

14. In a toaster, a horizontally disposed food supporting rack, heating means extending along and adjacent the rear edge of said rack, means preventing direct radiation from the heating means from impinging directly onto the rack area, lower heat reflection means for reflecting radiant heat from said heater at essentially uniform intensity in an upward direction over the rack area, upper heat reflection means extending over only the rear and central portions of the rack area to reflect radiant heat from said heater at essentially uniform intensity downwardly over the rack area, an outer shell including a rear wall and an upper wall enclosing said upper heat reflection means, said outer shell having its forward edge positioned substantially to the rear of, by approximately one-fourth of the fore-aft dimension of, and above the forward edge of, said rack to provide an access opening throughout the entire front portion of the toaster for permitting food to be easily placed on and removed from the rack by hand without contacting the surrounding toaster structure, said upper heat reflection means comprising a first surface extending above said heater, a second surface angularly adjoining the front edge of said first surface and extending over the rear portion of said rack, a third surface angularly adjoining the front edge of said second surface and extending over a central portion of said rack, and a fourth surface angularly adjoining the front edge of said surface and extending toward the forward edge of said upper wall.

15. A toaster comprising a pair of spaced sheet metal support plates, an elongated heater extending horizontally between said support plates with each end of said heater being supported by a respective one of said plates grill-like food supporting rack supported in a substantially horizontal position in front of said heater, a shield extending the length of said heater between the heater and the rack to prevent direct radiation onto said rack area, said shield having its ends connected to said support plates, lower heat reflection means extending beneath the heater and substantially the entire rack area for reflecting radiant heat from said heater at essentially uniform intensity in an upward direction onto the rack area, upper heat reflection means for reflecting radiant heat from said heater at essentially uniform intensity downwardly over the entire rack area, said upper heat reflection means extending over said heater and only a portion of said rack area so that there is nothing above the front portion of the rack thus permitting food to be easily placed on and removed from the rack by hand without contacting the surrounding toaster structure, said upper and lower heat reflection means being supported by said support plates, heat insulating means attached to said support plates including leg means for contacting a supporting surface and handle means by which the toaster may be held, and an outer metal shell connected to said support plates and covering the rear of the toaster and the upper reflection system.

References Cited in the file of this patent

UNITED STATES PATENTS

| | | |
|---|---|---|
| 1,587,023 | Mottlau | June 1, 1926 |
| 1,708,504 | Hunt | Apr. 9, 1929 |
| 1,885,041 | Baker | Oct. 25, 1932 |
| 2,134,474 | Gillespie | Oct. 25, 1938 |
| 2,368,026 | Jepson | Jan. 23, 1945 |
| 2,862,441 | Schmall | Dec. 2, 1958 |
| 2,907,269 | Roderick et al. | Oct. 6, 1959 |
| 3,095,186 | Sondy | June 25, 1963 |